(12) United States Patent
Guillou et al.

(10) Patent No.: US 7,260,264 B2
(45) Date of Patent: Aug. 21, 2007

(54) TRANSCODING OF DATA

(75) Inventors: Jeanne Guillou, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 837 days.

(21) Appl. No.: 10/625,699

(22) Filed: Jul. 24, 2003

(65) Prior Publication Data

US 2004/0223650 A1 Nov. 11, 2004

(30) Foreign Application Priority Data

Jul. 24, 2002 (FR) ................................. 02 09389

(51) Int. Cl.
*G06K 9/36* (2006.01)

(52) U.S. Cl. ...................... 382/232; 382/233; 382/236

(58) Field of Classification Search ................ 382/173, 382/232, 233, 236–240; 358/1.2, 1.15; 375/240
See application file for complete search history.

(56) References Cited

U.S. PATENT DOCUMENTS

| 6,501,860 | B1 | 12/2002 | Charrier et al. ............. 382/240 |
|---|---|---|---|
| 6,944,349 | B1 | 9/2005 | Onno et al. .................. 382/240 |
| 7,027,656 | B2 | 4/2006 | Henry et al. ................. 382/239 |
| 2002/0048319 | A1 | 4/2002 | Onno .......................... 375/240 |
| 2002/0051504 | A1 | 5/2002 | Onno .......................... 375/340 |
| 2002/0051583 | A1 | 5/2002 | Brown et al. ................ 382/299 |
| 2002/0191852 | A1 | 12/2002 | Le Leannec et al. ....... 382/233 |
| 2003/0018750 | A1 | 1/2003 | Onno et al. .................. 709/219 |
| 2003/0128878 | A1 | 7/2003 | Leannec et al. ............ 382/233 |
| 2003/0174897 | A1 | 9/2003 | Le Leannec et al. ....... 382/240 |
| 2004/0012820 | A1 | 1/2004 | Donescu et al. ........... 358/3.28 |

FOREIGN PATENT DOCUMENTS

| EP | 1045590 A2 | 10/2000 |
|---|---|---|
| EP | 1067798 A2 | 1/2001 |
| EP | 1195992 A1 | 4/2002 |
| FR | 2 805 117 | 8/2001 |
| WO | WO 00/65838 A2 | 11/2000 |
| WO | WO 01/91467 A1 | 11/2001 |
| WO | WO 02/45409 A1 | 6/2002 |

OTHER PUBLICATIONS

Sachin Deshpande et al., "HTTP Streaming of JPEG2000 Images", Proceedings International Conference On Information Technology: Coding and Computing, XP 002193324, Apr. 2, 2001, pp. 15-19.

*Primary Examiner*—Duy M. Dang
(74) *Attorney, Agent, or Firm*—Fitzpatrick, Cella, Harper & Scinto

(57) ABSTRACT

A method of transcoding a digital signal encoded according to a first encoding mode into a digital signal encoded according to a second encoding mode, the second encoding mode comprising a bit rate-distortion allocation of the encoded digital signal. The method comprises the steps of obtaining at least a first parameter of encoding the signal according to the first mode, obtaining at least a second parameter from an at least partial encoding of the signal according to the second mode, and selecting a bit rate-distortion allocation mode for the encoding of the signal according to the second mode, as a function of the first and second parameters.

23 Claims, 9 Drawing Sheets

TRANSCODING OF DATA

Figure 1:
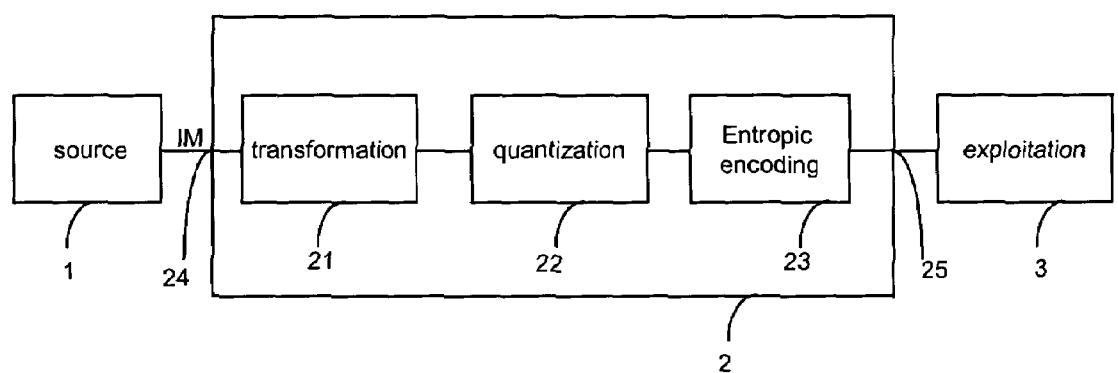

The present invention generally relates to digital signal encoding.

The object of encoding is to compress the signal, which makes it possible respectively to transmit the digital signal and to store it in memory while respectively reducing the transmission time, or the transmission rate, by reducing the space used in memory.

More particularly, the invention relates to the transcoding of a digital signal encoded according to a first encoding mode into a digital signal encoded according to a second encoding mode, the second encoding mode comprising a bit rate-distortion allocation of the encoded digital signal.

In what follows, the digital signal considered is a digital image, the first encoding mode is encoding according to the JPEG (Joint Photographic Expert Group) standard and the second encoding mode is encoding according to the JPEG2000 standard.

The JPEG2000 standard has numerous functionalities which do not exist in the JPEG standard. It is thus worthwhile to transcode images encoded according to the JPEG standard into images encoded using the JPEG2000 standard.

In order for a user to choose to carry out the transcoding, it is desirable for the transcoded image to have a bit rate equal or less than that of the image encoded according to the first encoding mode. It is also desirable for the quality of the image to be equal to or greater than that of the image encoded according to the first encoding mode.

To do this, parameters of the second encoding mode must be set during the transcoding between two encoding modes.

The object of the present invention is thus to provide a method of transcoding which gives a good compromise between bit rate and quality of the signal reconstituted after decoding, without involving the user in the setting of the parameters at the time of the transcoding.

To that end, the invention provides a method of transcoding a digital signal encoded according to a first encoding mode into a digital signal encoded according to a second encoding mode, the second encoding mode comprising a bit rate-distortion allocation of the encoded digital signal, characterized in that it comprises the steps of:
obtaining at least a first parameter of encoding the signal according to the first mode,
obtaining at least a second parameter from an at least partial encoding of the signal according to the second mode,
selecting a bit rate-distortion allocation mode for the encoding of the signal according to the second mode, as a function of the first and second parameters.

The invention thus enables transcoding to be achieved which provides a good compromise between bit rate and quality of the signal reconstituted after decoding, without involving the user in the setting of the parameters at the time of the transcoding.

According to a preferred feature, the first parameter is the bit rate of the signal encoded according to the first encoding mode.

According to a preferred feature, the second parameter is the maximum bit rate of the signal encoded according to the second encoding mode.

According to a preferred feature, the selection of a bit rate-distortion allocation mode for the encoding of the signal according to the second mode comprises the steps of:

comparing a fraction of the bit rate of the signal encoded according to the first encoding mode with the maximum bit rate of the signal encoded according to the second encoding mode,
selecting the maximum bit rate of the signal encoded according to the second encoding mode, as target bit rate of the allocation mode, if the maximum bit rate of the signal encoded according to the second encoding mode is less than the fraction of the bit rate of signal encoded according to the first encoding mode.

Thus, in this case, the encoded signal has a lower bit rate after transcoding, and a maximal signal quality is maintained.

According to a preferred feature, the selection of a bit rate-distortion allocation mode for the encoding of the signal according to the second mode comprises the steps of:

comparing a fraction of the bit rate of the signal encoded according to the first encoding mode with the maximum bit rate of the signal encoded according to the second encoding mode,
selecting the fraction of the bit rate of the signal encoded according to the first encoding mode, as target bit rate of the allocation mode, if the maximum bit rate of the signal encoded according to the second encoding mode is greater than the fraction of the bit rate of signal encoded according to the first encoding mode and if a quantization parameter of the first encoding mode is less than a predetermined threshold.

Thus, in this case, the encoded signal maintains the fraction of bit rate after transcoding, and a signal quality at least equal to that of the original signal is obtained.

According to a preferred feature, the selection of a bit rate-distortion allocation mode for the encoding of the signal according to the second mode comprises the steps of:

comparing a fraction of the bit rate of the signal encoded according to the first encoding mode with the maximum bit rate of the signal encoded according to the second encoding mode,
selecting a predetermined distortion as target distortion of the allocation mode, if the maximum bit rate of the signal encoded according to the second encoding mode is greater than the fraction of the bit rate of signal encoded according to the first encoding mode and if a quantization parameter of the first encoding mode is greater than a predetermined threshold.

Thus, in this case, the encoded signal has a bit rate which is in general less after transcoding, as has been observed experimentally, and an equivalent signal quality is obtained.

The fraction of the bit rate of signal encoded according to the first encoding mode is for example equal to one or to $\frac{2}{3}$.

According to a preferred feature, the first encoding mode is an encoding mode according to the JPEG standard.

According to a preferred feature, the second encoding mode is an encoding mode according to the JPEG2000 standard.

More particularly, the invention is well-suited to the transcoding of images between the JPEG and JPEG2000 standards.

In a complementary manner, the invention relates to a device for transcoding a digital signal encoded according to a first encoding mode into a digital signal encoded according to a second encoding mode, the second encoding mode comprising a bit rate-distortion allocation of the encoded digital signal, characterized in that it comprises:
means for obtaining at least a first parameter of encoding the signal according to the first mode, means for obtaining at least a second parameter from an at least partial encoding of the signal according to the second mode, means for selecting a bit rate-distortion allocation mode for the encoding of the signal according to the second mode, as a function of the first and second parameters.

The transcoding device comprises means for implementing the preceding features and has similar advantages to those already presented.

The invention also relates to a digital apparatus including the device according to the invention or means for implementing the method according to the invention. This digital apparatus is for example a digital camera, a digital camcorder, a scanner, a printer, a photocopier, or a fax machine. The advantages of the device and of the digital apparatus are identical to those already set out.

An information storage means, which can be read by a computer or microprocessor, integrated or not into the device, and possibly removable, stores a program implementing the method according to the invention.

A computer program readable by a microprocessor and comprising one or more sequences of instructions is capable of implementing the methods according to the invention.

Figure 2:
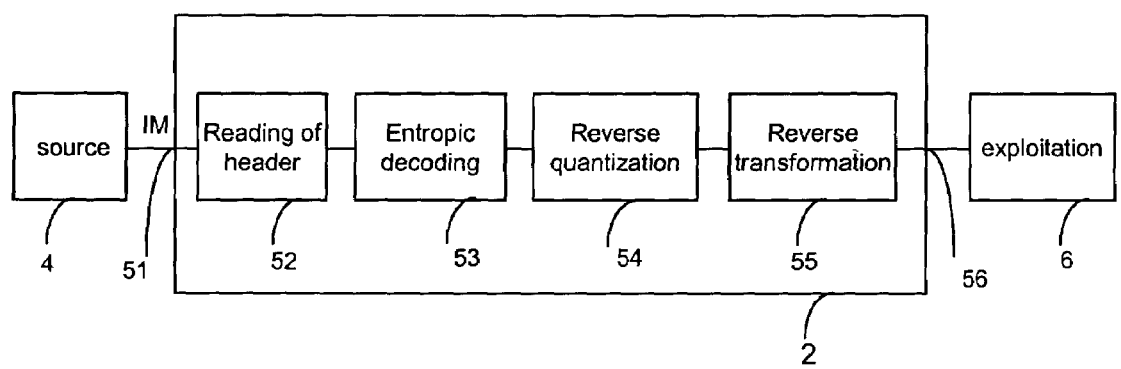
Figure 3:
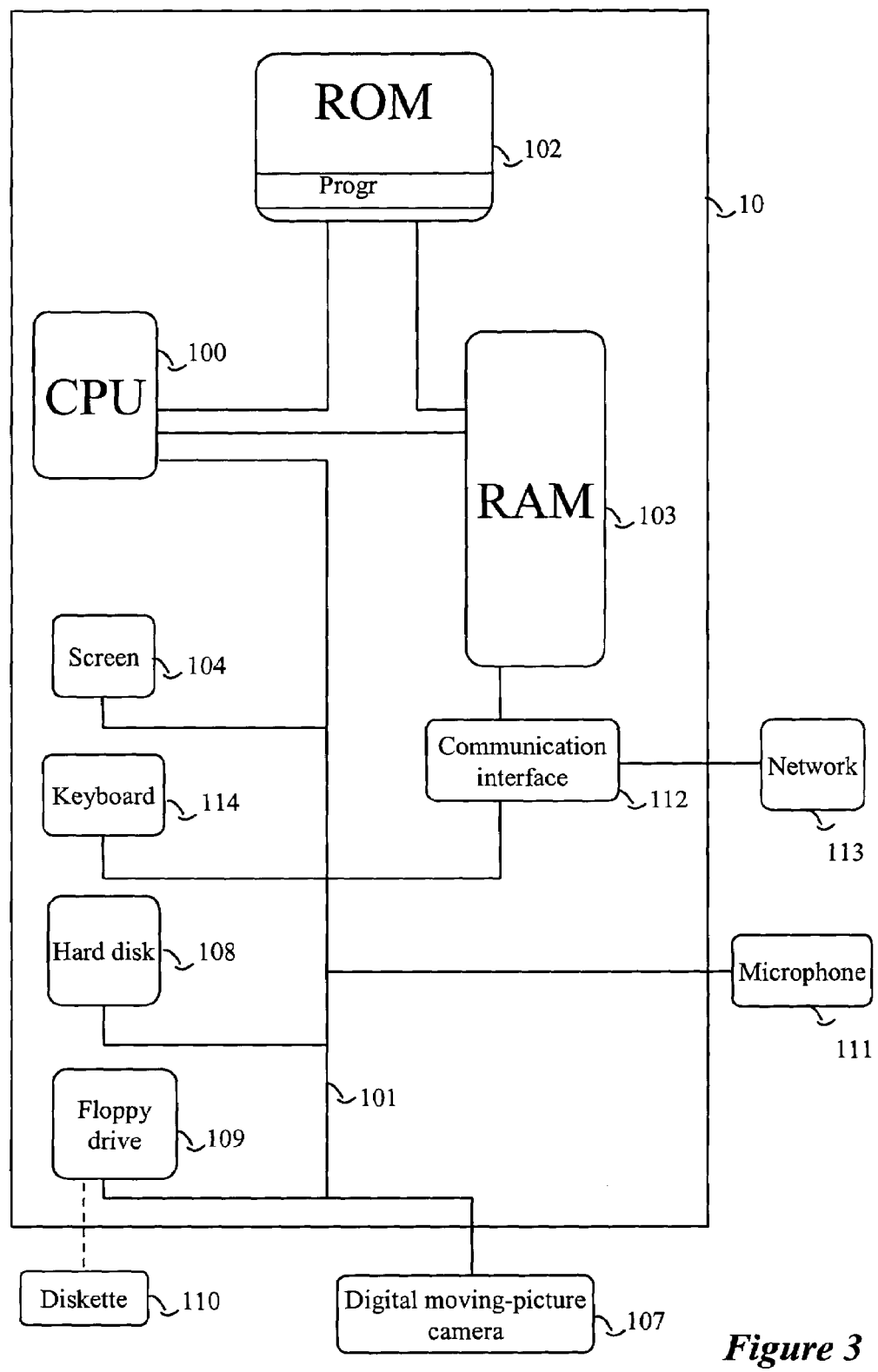
Figure 4:
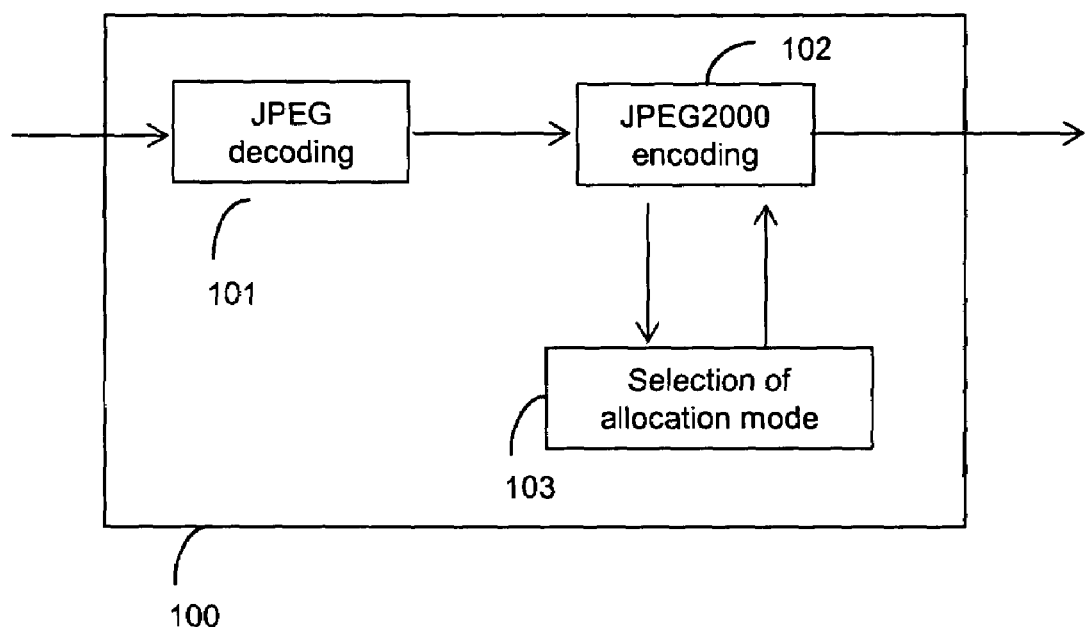
Figure 5:
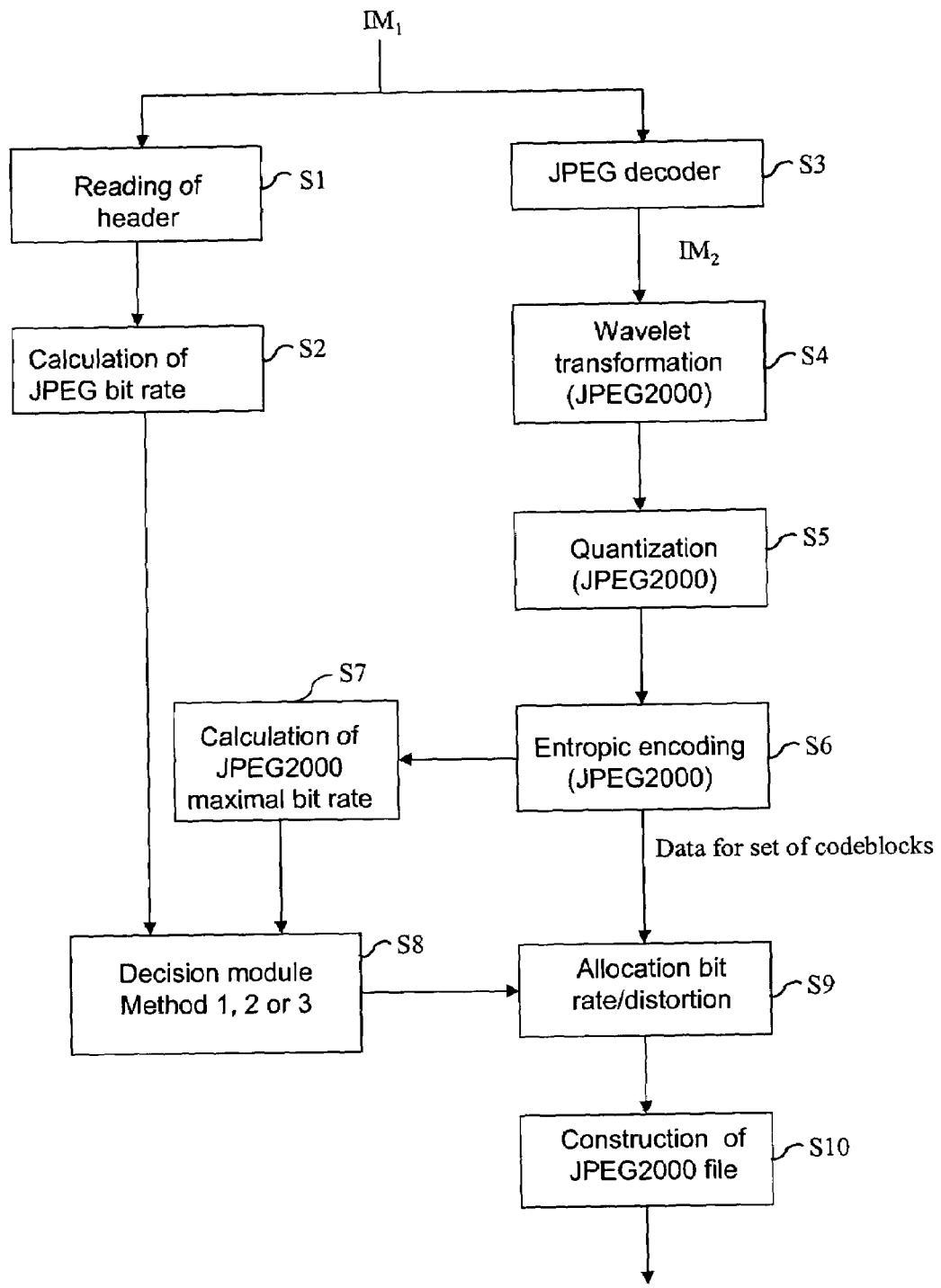
Figure 6:
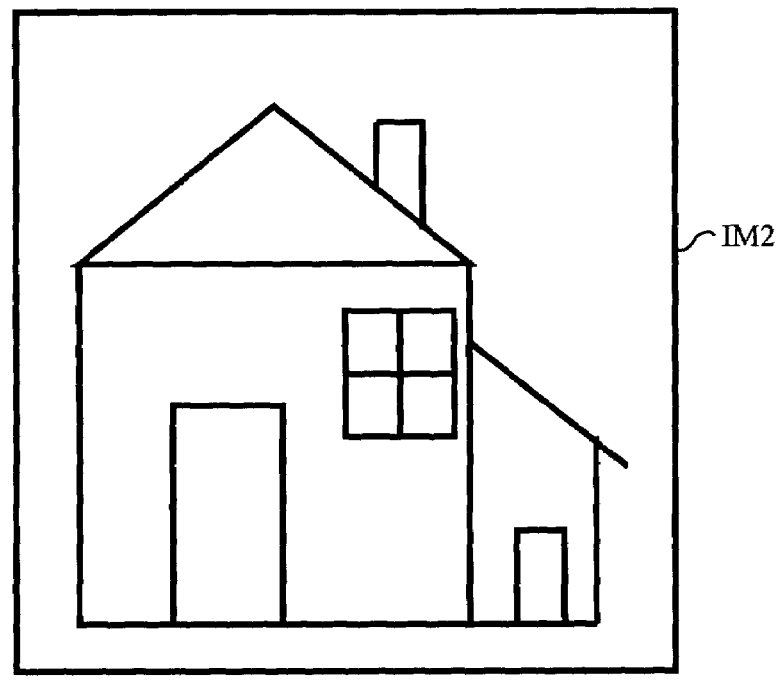
Figure 6:
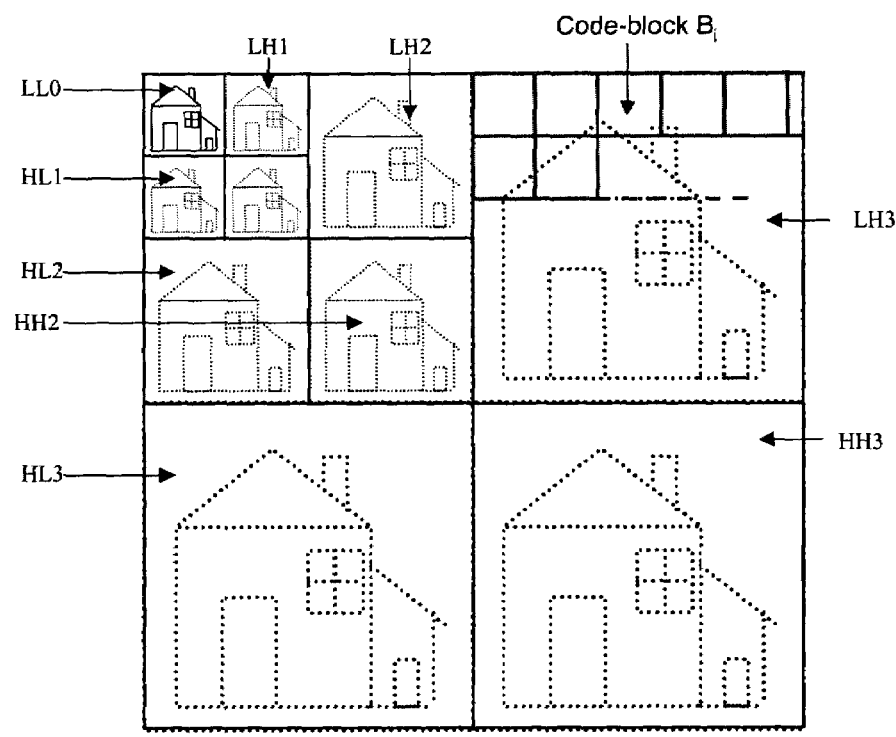
Figure 7:
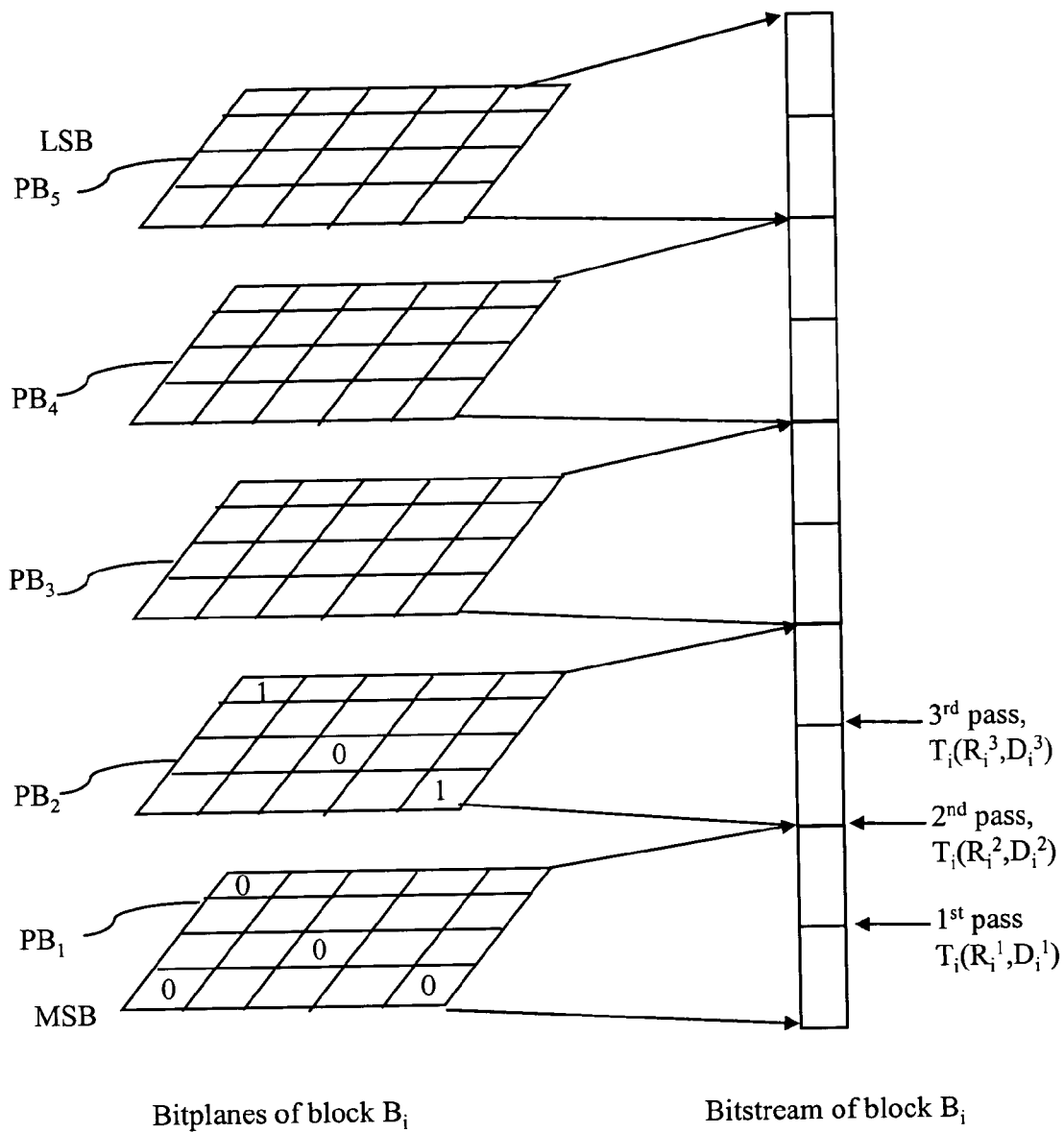
Figure 8:
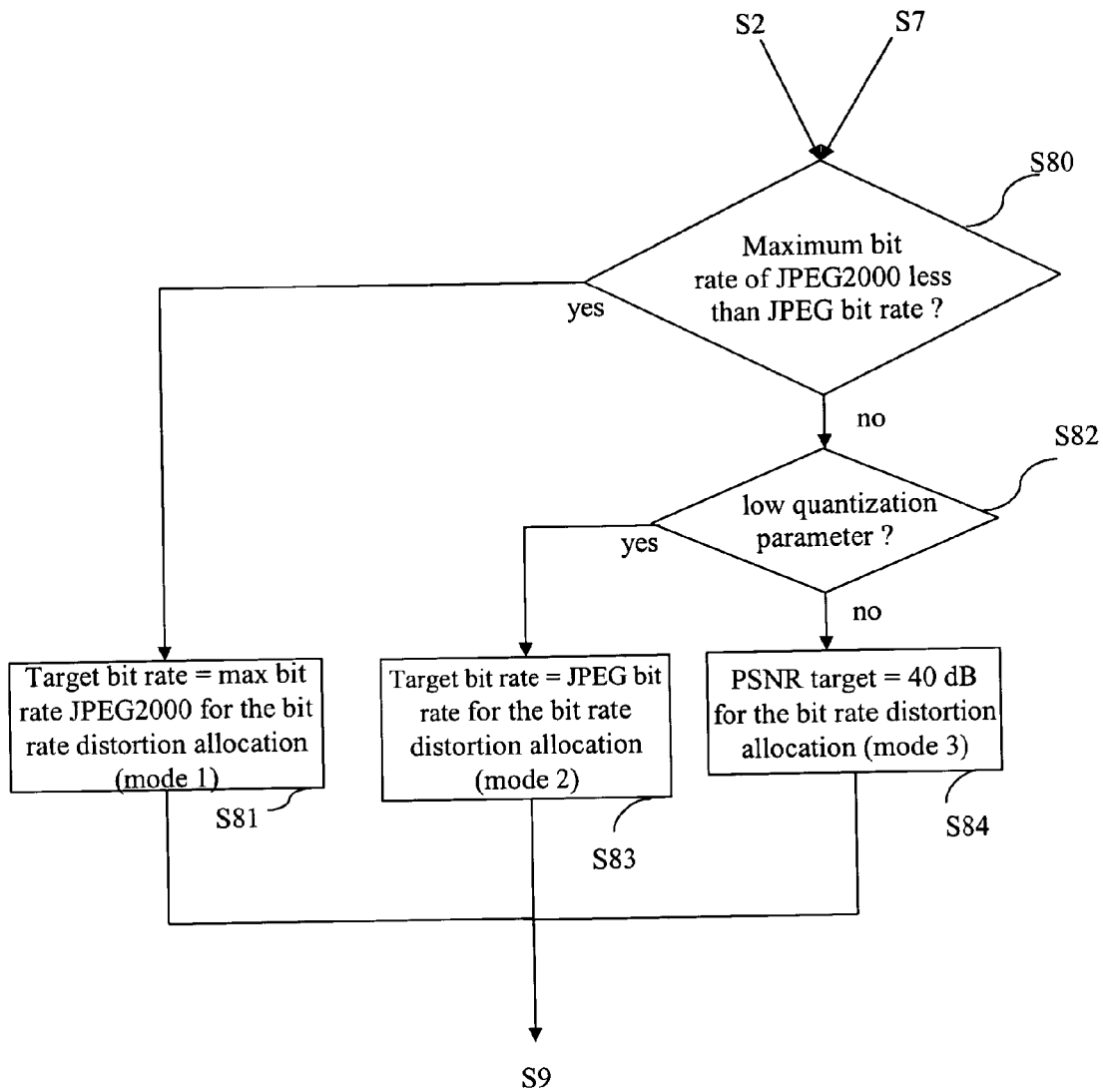
Figure 9:
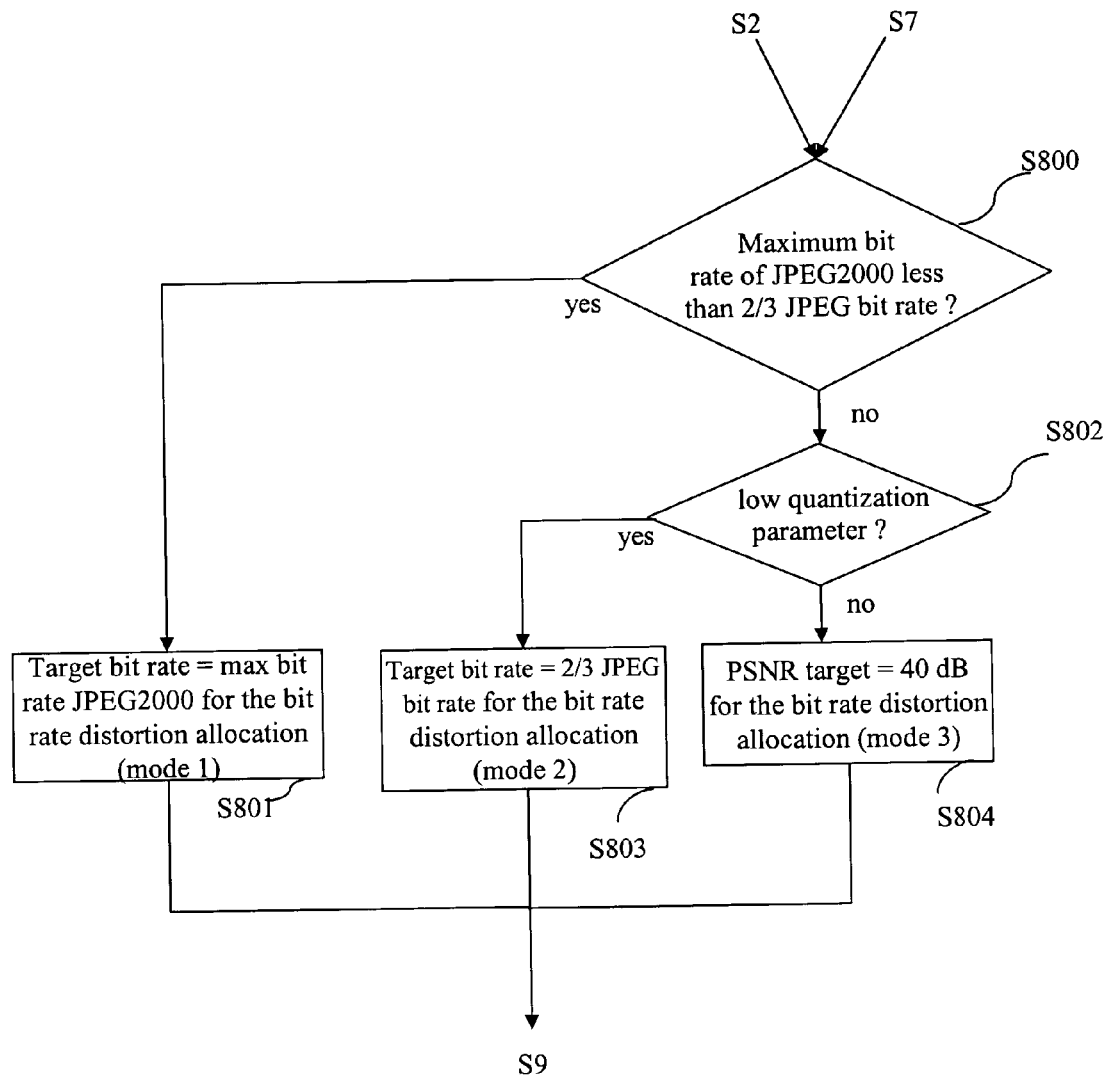

The characteristics and advantages of the present invention will appear more clearly from a reading of a preferred embodiment illustrated by the accompanying drawings, in which:

FIG. 1 represents an embodiment of an encoding device,

FIG. 2 represents an embodiment of a decoding device corresponding to the preceding encoding device, FIGS. 3 and 4 represent embodiments of a transcoding device according to the invention, FIG. 5 represents a transcoding method embodiment according to the invention, FIG. 6 represents an image in course of being processed according to the invention, FIG. 7 represents truncation points implemented in the present invention, FIG. 8 represents a first embodiment of a step of selecting a bit rate-distortion allocation mode, included in the method of FIG. 5, FIG. 9 represents a second embodiment of a step of selecting a bit rate-distortion allocation mode, included in the method of FIG. 5.

FIG. 1 represents a data encoding device in the form of a device 2 which comprises an input 24 to which a source 1 of non-encoded data is connected. This encoding device is conventional and represents a general schema for encoding. For example, it performs encoding of data it receives according to the JPEG2000 standard.

The source 1 comprises for example a memory means, such as a random access memory, a hard disk, a diskette or a compact disc, for storing non-coded data, this memory means being associated with a suitable reading means for reading the data therein. A means for recording the data in the memory means can also be provided.

It will be considered more particularly hereinafter that the data to be encoded are a series of original digital samples representing physical quantities and representing, for example, an image IM.

The source 1 supplies a digital image signal IM to the input of the encoding circuit 2. The image signal IM is a series of digital words, for example bytes. Each byte value represents a pixel of the image IM, here with 256 levels of gray, or black and white image. The image can be a multispectral image, for example a color image having components in three frequency bands, of the red-green-blue or luminance and chrominance type. Either the color image is processed in its entirety, or each component is processed in a similar manner to the monospectral image.

The encoding device 2 comprises conventionally, as from the input 24, a transformation circuit 21 which uses decompositions of the data signal into frequency sub-band signals, so as to perform an analysis of the signal.

The transformation circuit 21 is connected to a quantization circuit 22. The quantization circuit implements a quantization which is known per se, for example a scalar quantization, or a vector quantization, of the coefficients, or groups of coefficients, of the frequency sub-band signals supplied by the circuit 21.

The circuit 22 is connected to an entropic encoding circuit 23, which performs an entropic encoding, for example a Huffman encoding, or an arithmetic encoding, of the data quantized by the circuit 22.

The encoding device 2 supplies the encoded data in the form of a bitstream to encoded data using means 3 connected to the output 25 of the encoding device 2.

The using means 3 comprises for example means of storing encoded data, and/or means of transmitting encoded data.

FIG. 2 shows a data decoding device 5, the data having been encoded by the device 2.

Encoded data using means 4 are connected to the input 51 of the decoding device 5. The means 4 comprise for example encoded data storage means, and/or means for receiving encoded data which are adapted to receive the encoded data transmitted by the transmission means 3 (FIG. 1).

The decoding device 5 performs operations which are generally the reverse of those of the encoding device 2.

The device 5 receives the encoded signal at the input 51, from where it comprises a circuit 52 for reading the header of the encoded signal. The header of the encoded signal comprises the parameters necessary for the decoding.

This circuit 52 makes it possible in particular to read the data concerning the size of the set of original samples (image) constituting the image signal and its resolution, that is to say the number of levels of decomposition into frequency sub-bands of this set.

The device 5 also comprises an entropic decoding circuit 53, which performs an entropic decoding corresponding to the encoding of the circuit 23 of FIG. 1. The circuit 53 is connected to a dequantization circuit 54, corresponding to the quantization circuit 22. The circuit 54 is connected to a reverse transformation circuit 55, corresponding to the transformation circuit 21. The transformations envisaged here perform a synthesis of the digital signal, from frequency sub-band signals.

Decoded data using means 6 are connected at the output 56 of the decoding device 5. The user means 6 are for example means for viewing images, or means for sound reproduction, according to the nature of the data processed.

The encoding device and/or the decoding device can be integrated into a digital apparatus, such as a computer, printer, facsimile machine, scanner or digital photographic apparatus, for example.

The encoding device and the decoding device can be integrated into the same digital apparatus, for example a digital photographic apparatus.

The encoding device and the decoding device may be integrated into two remote digital apparatuses adapted to communicate together.

According to the chosen embodiment represented in FIG. 3, a device implementing the invention is for example a microcomputer 10 connected to different peripherals, for example a digital moving picture camera 107 (or a scanner, or any means of acquiring or storing an image) connected to a graphics card and supplying information to be processed according to the invention.

The device 10 comprises a communication interface 112 connected to a network 113 able to transmit digital data to be processed or conversely to transmit data processed by the device. The device 10 also comprises a storage means 108 such as a hard disk. It also comprises a drive 109 for a disk 110. This disk 110 may for example be a diskette, a CD-ROM, or a DVD-ROM. The disk 110 like the hard disk 108 can contain data processed according to the invention as well as the program or programs implementing the invention which, once read by the device 10, will be stored on the hard disk 108. According to a variant, the program enabling the device to implement the invention can be stored in read-only memory 102 (referred to as ROM in the drawing). In a second variant, the program can be received in order to be stored in an identical fashion to that described previously via the communication network 113.

The device 10 is connected to a microphone 111. The data to be processed according to the invention will in this case be audio signal.

This same device has a screen 104 for displaying the data to be processed or serving as an interface with the user, who can thus parameterize certain processing modes, using the keyboard 114 or any other means (a mouse for example).

The central processing unit 100 (referred to as CPU in the drawing) executes the instructions relating to the implementation of the invention, which are stored in the read only memory 102 or in the other storage means. On powering up, the processing programs stored in a non-volatile memory, for example the ROM 102, are transferred into the random access memory RAM 103, which will then contain the executable code of the invention, as well as registers for storing the variables necessary for implementing the invention.

In more general terms, an information storage means, which can be read by a computer or microprocessor, integrated or not into the device, and which may possibly be removable, stores a program implementing the method according to the invention The communication bus 101 affords communication between the different elements included in the microcomputer 10 or connected to it. The representation of the bus 101 is not limiting and, in particular, the central processing unit 100 is able to communicate instructions to any component of the microcomputer 10 directly or by means of another element of the microcomputer 10.

With reference to FIG. 4, an embodiment of a transcoding device 100 according to the invention is adapted to transcode a digital signal encoded according to a first encoding mode into a digital signal encoded according to a second encoding mode. The transcoding device is integrated into an apparatus, which is for example a digital camera, a digital camcorder, a scanner, a printer, a photocopier, a fax machine, a system of database management, or a computer.

The device receives an image encoded according to the JPEG standard.

The device according to the invention comprises means 101 for obtaining at least a first parameter of encoding the signal according to the first mode, means 102 for obtaining at least a second parameter from an at least partial encoding of the signal according to the second mode, means 103 for selecting a bit rate-distortion allocation mode for the encoding of the signal according to the second mode, as a function of the first and second parameters.

The device provides an image encoded according to the JPEG2000 standard.

The operation of the device is detailed by the algorithms which follow.

FIG. 5 represents an embodiment of a method of transcoding an image, according to the invention. This method is implemented in the transcoding device and comprises the steps S1 to S10.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

As input we have an image $IM_1$ encoded according to the JPEG standard.

Step S1 is a reading of the header of the encoded image $IM_1$. This reading makes it possible to know in particular the dimensions of the image and the quantization tables used for the encoding.

The following step S2 is a calculation of the bit rate in terms of bits per pixel of the encoded image $IM_1$. This calculation is made by dividing the size in bits of the bitstream containing the JPEG encoded data of the image IM, by the size of the image in pixels.

Step S3 is a decoding of that image. The result of this decoding is a raw image $IM_2$.

The following step S4 is a transformation of the image $IM_2$, in accordance with the JPEG2000 standard. This transformation is a Discrete Wavelet Transform (DWT). Its purpose is to transform spatial coefficients into spatio-frequency coefficients. These spatio-frequency coefficients form part of the frequency sub-bands, distributed in several resolution levels.

To illustrate step S4, FIG. 6 represents the image $IM_2$ and the image resulting from its transformation into wavelets. In this example, the image $IM_2$ has been analyzed into ten frequency sub-bands distributed in three decomposition levels.

The transformed image is the result of a filtering of the original image in the horizontal direction and in the vertical direction.

The sub-band $LL_0$ with the lowest frequency, also referred to as the low sub-band, is a reduction of the original image. The other sub-bands are detail sub-bands.

The sub-band $LL_0$ comprises the components, or coefficients, of low frequency, in both directions, of the image signal. The sub-band $LH_1$ comprises the components of low frequency in a first direction and of high frequency in a second direction, of the image signal. The sub-band $HL_1$ comprises the components of high frequency in the first direction and the components of low frequency in the second direction. Finally, the sub-band $HH_1$ comprises the components of high frequency in both directions.

The second resolution level comprises the sub-bands $HL_2$, $LH_2$ and $HH_2$ and the highest resolution level comprises the sub-bands $HL_3$, $LH_3$ and $HH_3$.

Naturally, the number of resolution levels, and consequently of sub-bands, can be chosen differently, for example 13 sub-bands and four resolution levels, for a bi-dimensional signal such as an image. The number of sub-bands per resolution level can also be different.

Referring again to FIG. 5, the following step S5 is a scalar quantization of the coefficients of the sub-bands obtained at the preceding step.

For example a specific quantization step size is used for each sub-band. This quantization is known per se and will not be detailed here. The following step S6 is an entropy encoding of the data coming from the preceding step, still according to the JPEG2000 standard. For this, each sub-band is divided beforehand into blocks of coefficients, then each block is encoded entropically. The encoded data of a block are called a codeblock. The result of this step is a set of code-blocks of the image under consideration.

This step constitutes a partial encoding according to the JPEG2000 standard.

Step S6 is followed by step S7 which is a determination of the maximal bit rate of the image encoded according to the JPEG2000 standard. The maximal bit rate is the bit rate of the encoded data in the case in which all the code-blocks are completely included in the bitstream.

Steps S2 and S7 are followed by step S8 which is a selection of the bit rate-distortion allocation mode for the encoding according to the JPEG2000 standard. This step will be detailed below.

Steps S6 and S8 are followed by step S9 which is a bit rate-distortion allocation according to the mode selected at step S8, applied to the data determined at step S6. Step S9 comprises for example the application of the Post Component Rate-Distortion (PCRD) optimization algorithm to the code-blocks resulting from step S6.

The bit rate-distortion allocation is a truncation point optimization algorithm. This algorithm comprises the selection, for each of the blocks of data, of a bit rate-distortion pair, as a function of a global rate or a global distortion. This selection amounts to keeping only some of the coded information for each block. The quantity of encoded information kept for each block is indicated by a truncation point, which is an index representing the selected bit rate-distortion pair.

FIG. 7 illustrates the entropic en coding by bit planes of a block $B_i$. Such an encoding is described in the article entitled "High performance scalable image compression with EBCOT" by D. Taubman, which appeared in "IEEE Transactions on image processing", Vol. 9, N° 7, July 2000, pages 1158 to 1170. This encoding is progressive, and also is of the scalable type.

Each coefficient of a block is a real number which is quantized, for example over five bits as in FIG. 7. The bit plane $PB_1$ contains the MSB's (Most Significant Bits) of the coefficients of the block $B_i$. The bit planes $PB_2$ to $PB_5$ contain respectively bits that are less and less significant of the coefficients of the block $B_i$. The bit plane $PB_5$ thus contains the LSB's (Least Significant Bits) of the coefficients of the block $B_i$.

Each bit plane is encoded in several passes.

The result of the first encoding pass is a part of the encoded data for the block in question, and the result of the second pass is another part of the encoded data comprising supplementary details.

In the final bitstream it may be chosen to include only a part of the data corresponding to a whole number of passes: each pass thus corresponds to a possible truncation point of the bitstream for the block considered. With each pass there is associated a bit rate-distortion pair which corresponds to the supplementary rate and to the decrease in overall distortion for the reconstructed image when the corresponding data are included in the final bitstream.

The bit rate-distortion allocation corresponds to the selection, for each of the blocks, of a truncation point of the data $T_i(R_i^n, D_i^n)$. The criterion for optimizing the truncation points may for example to be to minimize the total distortion $$D = \sum_i D_i^{n_i}$$

of the image with a rate constraint $$R = \sum_i R_i^{n_i} \leq R_{max},$$

or else to minimize the total rate $$R = \sum_i R_i^{n_i}$$

of the image with a distortion constraint $$D = \sum_i D_i^{n_i} \leq D_{max}.$$

With reference to FIG. 5, the following step S10 is the construction of the file containing the data encoded according to the JPEG2000 standard.

A first embodiment of the step S8 of selecting a mode of bit rate-distortion allocation is detailed with reference to FIG. 8 in the form of an algorithm comprising steps S80 to S84.

Step S80 is a test to determine whether the maximal rate of the image encoded according to the JPEG2000 standard is less than the bit rate of the image encoded according to the JPEG standard.

If the response is positive, then step S80 is followed by the step S81 at which a first mode of bit rate-distortion allocation is selected. This first mode is such that all the code-blocks are completely included in the bitstream containing the encoded data. Thus an encoded image is obtained having a lower bit rate than that encoded according to the JPEG standard. The image obtained has a minimal distortion, which may even be zero if the JPEG2000 encoding is reversible, with respect to the image encoded in JPEG mode, since no truncation point is applied. The quality of the image after decoding will be maximal.

When the response is negative at step S80, this step is followed by the step S82 which is a test to determine if the quantization parameter of the encoding according to the JPEG standard is less than a predetermined threshold, that is to say if the image is coarsely encoded.

When the standard default JPEG tables are used for the JPEG encoding, a sole parameter, known as the quality parameter, which is between 0 and 100, makes it possible to deduce the 64 quantization coefficients of the luminance tables and the 64 quantization coefficients of the chrominance tables.

The inventors have determined experimentally that a quality parameter of value 75 is a threshold giving good results, i.e. an image sufficiently finely encoded to provide a decoded image having a good visual quality.

In variant form, when the image has been encoded according to the JPEG standard with a quantization table different to the default table, the sum C is calculated of the differences between the coefficients of the default table for a quality parameter equal to 75 and those of the current table, weighted with the value of the default coefficients for a quality parameter equal to 50, according to the following formula:

$$C = \Sigma_{i=0}^{63}[(T_{75}(i) - T_c(i))/T_{50}(i)]$$

in which:
the parameter i is an index between 0 and 63, representing a current coefficient in the quantization table,
$T_{75}$ is the standard quantization table by default for a quality parameter equal to 75,
$T_{50}$ is the standard quantization table by default for a quality parameter equal to 50,
$T_c$ is the quantization table of the current image which is being transcoded.

This calculation makes it possible to take into account the importance of the low frequencies with respect to the high frequencies.

If the result C is negative, it is considered that the response to the test is positive, and thus that the quality parameter is low, which implies a low quality of the image. Conversely, if the result C is positive, it is considered that the response to the test is negative, and thus that the quality parameter is high, which implies a good quality of the image.

When the response is positive at step S82, that step is followed by the step S83 at which a second mode of bit rate-distortion allocation is selected. This second allocation mode sets an allocation with a target bit rate equal to the bit rate of the image encoded according to the JPEG standard. Thus, the result of the encoding of the image according to the JPEG2000 standard will have a bit rate equal to the bit rate of the image encoded according to the JPEG standard. The inventors have observed that the quality of the image is generally greater than that of the original image.

The second mode of bit rate-distortion allocation is designed as a function of the results of steps S80 and S82, according to which:
the maximal bit rate of the image encoded according to the JPEG2000 standard is greater than the bit rate of the image encoded according to the JPEG standard. The bit rate will thus be limited and consequently a target bit rate will be chosen equal to that of the image encoded according to the JPEG standard.
The image encoded according to the JPEG standard is encoded with a low quantization parameter, and it thus has differences with respect to the original image. These differences are in particular artifacts induced by the JPEG encoding, such as the block effects. On encoding according to the JPEG2000 standard, the transformation into wavelets smoothes the earlier artifacts, such that the image after JPEG2000 decoding appears closer to the original image.

The second mode of bit rate-distortion allocation thus comprises the determination of the truncation points in the code-blocks (step S9).

When the response is negative at step S82, that step is followed by the step S84 at which a third mode of bit rate-distortion allocation is selected. This third mode sets an allocation with a PSNR as target distortion set to N dB. The value of the parameter N is for example equal to 40. Thus the differences between the images after JPEG decoding and after JPEG2000 decoding have low visibility. An image is obtained after JPEG2000 decoding of good quality, with a bit rate generally less than that of the image encoded according to the JPEG standard.

The third mode of bit rate-distortion allocation is designed as a function of the results of steps S80 and S82, according to which:
the maximal bit rate of the image encoded according to the JPEG2000 standard is greater than the bit rate of the image encoded according to the JPEG standard. The bit rate will thus be limited by not including the entirety of the code-blocks in the data encoded according to the JPEG2000 standard.
The image encoded according to the JPEG standard is encoded with a high quantization parameter, and it thus has little difference with respect to the original image.
the transcoded image has, for a bit rate generally less than that of the image encoded according to the JPEG standard, a distortion value with respect to the JPEG encoded image which is greater than 40 dB. As up to a distortion of 40 dB the differences are difficult to see, a distortion of 40 dB is set for the bit rate-distortion allocation.

The third mode of bit rate-distortion allocation thus comprises the determination of the truncation points in the code-blocks (step S9).

A second embodiment of the step S8 of selecting a mode of bit rate-distortion allocation is detailed with reference to FIG. 9 in the form of an algorithm comprising steps S800 to S804.

In this embodiment, it is desired for the image encoded according to the JPEG2000 standard to have a bit rate well below that of the image encoded according to the JPEG standard, while maintaining good quality. For example, it is desired for the bit rate of the image encoded according to the JPEG2000 standard to correspond to a fraction of the bit rate of the image encoded according to the JPEG standard. This fraction is for example ⅔.

Step S800 is a test to determine whether the maximal rate of the image encoded according to the JPEG2000 standard is less than ⅔ of the bit rate of the image encoded according to the JPEG standard.

If the response is positive, then step S800 is followed by the step S801 at which a first mode of bit rate-distortion allocation is selected. This first mode is such that all the code-blocks are completely included in the bitstream containing the encoded data. Thus an encoded image is obtained having a bit rate less than ⅔ of the bit rate of the image encoded according to the JPEG standard. The image obtained has a minimal distortion, which may even be zero if the JPEG2000 encoding is reversible, with respect to the image encoded in JPEG mode, since no truncation point is applied. The quality of the image after decoding will be maximal while respecting the desired rate reduction.

When the response is negative at step S800, this step is followed by the step S802 which is identical to step E82 of FIG. 8.

When the response is positive at step S802, that step is followed by the step S803 at which a second mode of bit rate-distortion allocation is selected. This second allocation mode sets an allocation with a target bit rate equal to ⅔ of the bit rate of the image encoded according to the JPEG standard. Thus, the result of the encoding of the image according to the JPEG2000 standard will have a bit rate equal to ⅔ of the bit rate of the image encoded according to the JPEG standard. The inventors have observed that the quality of the image is generally similar to that of the original image.

The second mode of bit rate-distortion allocation is designed as a function of the results of steps S800 and S802, according to which:

the maximal bit rate of the image encoded according to the JPEG2000 standard is greater than the bit rate of the image encoded according to the JPEG standard. The bit rate will thus be limited and consequently a target bit rate will be chosen equal to ⅔ of that of the image encoded according to the JPEG standard.

The image encoded according to the JPEG standard is encoded with a low quantization parameter, and it thus has differences with respect to the original image. These differences are in particular artifacts induced by the JPEG encoding, such as the block effects. On encoding according to the JPEG2000 standard, the transformation into wavelets smoothes the earlier artifacts, such that the image after JPEG2000 decoding appears closer to the original image.

The second mode of bit rate-distortion allocation thus comprises the determination of the truncation points in the code-blocks (step S9).

When the response is negative at step S802, that step is followed by the step S804 at which a third mode of bit rate-distortion allocation is selected. This third mode sets an allocation with a PSNR as target distortion set to N dB. The value of the parameter N is for example equal to 40. Thus the differences between the images after JPEG decoding and after JPEG2000 decoding have low visibility. An image is obtained after JPEG2000 decoding of good quality, with a bit rate generally less than that of the image encoded according to the JPEG standard.

The third mode of bit rate-distortion allocation is designed as a function of the results of steps S800 and S802, according to which:

the maximal bit rate of the image encoded according to the JPEG2000 standard is greater than ⅔ of the bit rate of the image encoded according to the JPEG standard. The bit rate will thus be limited as much as possible while maintaining a good level of quality by not including the entirety of the code-blocks in the data encoded according to the JPEG2000 standard.

The image encoded according to the JPEG standard is encoded with a high quantization parameter, and it thus has little difference with respect to the original image.

the transcoded image has, for a bit rate similar to that of the image encoded according to the JPEG standard, a distortion value with respect to the JPEG encoded image which is greater than 40 dB. As up to a distortion of 40 dB the differences are difficult to see, a distortion of 40 dB is set for the bit rate-distortion allocation.

The third mode of bit rate-distortion allocation thus comprises the determination of the truncation points in the code-blocks (step S9).

Other embodiments of step S8 are possible. In particular, if it is desired to give priority to the quality of the JPEG2000 image rather than to minimizing the cost, the third bit rate-distortion allocation mode is an allocation with a target bit rate equal to the bit rate of the image encoded in accordance with the JPEG standard.

Of course, the present invention is in no way limited to the embodiments described and represented, but encompasses, on the contrary, any variant form within the capability of the person skilled in the art.

The invention claimed is:

1. A method of transcoding a digital signal encoded according to a first encoding mode into a digital signal encoded according to a second encoding mode, the second encoding mode comprising a bit rate-distortion allocation of the encoded digital signal, comprising the steps of:

obtaining at least a first parameter of encoding the signal according to the first mode;

obtaining at least a second parameter from an at least partial encoding of the signal according to the second mode; and selecting a bit rate-distortion allocation mode for the encoding of the signal according to the second mode, as a function of the first and second parameters.

2. A transcoding method according to claim 1, in which the first parameter is the bit rate of the signal encoded according to the first encoding mode.

3. A transcoding method according to claim 1 or 2, in which the second parameter is the maximum bit rate of the signal encoded according to the second encoding mode.

4. A method of transcoding according to claim 3, in which the selection of a bit rate-distortion allocation mode for the encoding of the signal according to the second mode comprises the steps of:

comparing a fraction of the bit rate of the signal encoded according to the first encoding mode with the maximum bit rate of the signal encoded according to the second encoding mode; and selecting the maximum bit rate of the signal encoded according to the second encoding mode, as target bit rate of the allocation mode, if the maximum bit rate of the signal encoded according to the second encoding mode is less than the fraction of the bit rate of signal encoded according to the first encoding mode.

5. A method of transcoding according to claim 3, in which the selection of a bit rate-distortion allocation mode for the encoding of the signal according to the second mode comprises the steps of:

comparing a fraction of the bit rate of the signal encoded according to the first encoding mode with the maximum bit rate of the signal encoded according to the second encoding mode; and selecting the fraction of the bit rate of the signal encoded according to the first encoding mode, as target bit rate of the allocation mode, if the maximum bit rate of the signal encoded according to the second encoding mode is greater than the fraction of the bit rate of signal encoded according to the first encoding mode and if a quantization parameter of the first encoding mode is less than a predetermined threshold.

6. A method of transcoding according to claim 3, in which the selection of a bit rate-distortion allocation mode for the encoding of the signal according to the second mode comprises the steps of:

comparing a fraction of the bit rate of the signal encoded according to the first encoding mode with the maximum bit rate of the signal encoded according to the second encoding mode; and selecting a predetermined distortion as target distortion of the allocation mode, if the maximum bit rate of the signal encoded according to the second encoding mode is greater than the fraction of the bit rate of signal encoded according to the first encoding mode and if a quantization parameter of the first encoding mode is greater than a predetermined threshold.

7. A method of transcoding according to claim 1 or 2, in which the first encoding mode is an encoding according to the JPEG standard.

8. A method of transcoding according to claim 1 or 2, in which the second encoding mode is an encoding according to the JPEG2000 standard.

9. A device for transcoding a digital signal encoded according to a first encoding mode into a digital signal encoded according to a second encoding mode, the second encoding mode comprising a bit rate-distortion allocation of the encoded digital signal, comprising:
 means for obtaining at least a first parameter of encoding the signal according to the first mode;
 means for obtaining at least a second parameter from an at least partial encoding of the signal according to the second mode; and
 means for selecting a bit rate-distortion allocation mode for the encoding of the signal according to the second mode, as a function of the first and second parameters.

10. A transcoding device according to claim 9, adapted to implement a first parameter which is the bit rate of the signal encoded according to the first encoding mode.

11. A transcoding device according to claim 9 or 10, adapted to implement a second parameter which is the maximum bit rate of the signal encoded according to the second encoding mode.

12. A transcoding device according to claim 11, wherein said means for selecting a bit rate-distortion allocation mode for the encoding of the signal according to the second mode comprise:
 means for comparing a fraction of the bit rate of the signal encoded according to the first encoding mode with the maximum bit rate of the signal encoded according to the second encoding mode; and
 means for selecting the maximum bit rate of the signal encoded according to the second encoding mode, as target bit rate of the allocation mode, if the maximum bit rate of the signal encoded according to the second encoding mode is less than the fraction of the bit rate of signal encoded according to the first encoding mode.

13. A transcoding device according to claim 11, wherein said means for selecting a bit rate-distortion allocation mode for the encoding of the signal according to the second mode comprise:
 means for comparing a fraction of the bit rate of the signal encoded according to the first encoding mode with the maximum bit rate of the signal encoded according to the second encoding mode; and
 means for selecting the fraction of the bit rate of the signal encoded according to the first encoding mode, as target bit rate of the allocation mode, if the maximum bit rate of the signal encoded according to the second encoding mode is greater than the fraction of the bit rate of signal encoded according to the first encoding mode and if a quantization parameter of the first encoding mode is less than a predetermined threshold.

14. A transcoding device according to claim 11, wherein said means for selecting a bit rate-distortion allocation mode for the encoding of the signal according to the second mode comprise:
 means for comparing a fraction of the bit rate of the signal encoded according to the first encoding mode with the maximum bit rate of the signal encoded according to the second encoding mode; and
 means for selecting a predetermined distortion as target distortion of the allocation mode, if the maximum bit rate of the signal encoded according to the second encoding mode is greater than the fraction of the bit rate of signal encoded according to the first encoding mode and if a quantization parameter of the first encoding mode is greater than a predetermined threshold.

15. A transcoding device according to claim 9 or 10, adapted to implement a first encoding mode which is an encoding according to the JPEG standard.

16. A transcoding device according to claim 9 or 10, adapted to implement a second encoding mode which is an encoding according to the JPEG2000 standard.

17. A transcoding device according to claim 9 or 10, wherein said means for obtaining and selecting are incorporated in:
 a microprocessor;
 a read only memory, comprising a program for processing the data; and
 a random access memory comprising registers adapted to record variables modified during the execution of said program.

18. An apparatus for processing a digital image, adapted to implement the method according to claim 1 or 2.

19. An apparatus (10) for processing a digital image, comprising the device according to claim 9 or 10.

20. A computer-readable storage medium storing a program for implementing the method according to claim 1 or 2.

21. A computer-readable storage medium storing a program for implementing a method of transcoding a digital signal encoded according to a first encoding mode into a digital signal encoded according to a second encoding mode, the second encoding mode comprising a bit rate-distortion allocation of the encoded digital signal, the method comprising the steps of:
 obtaining at least a first parameter of encoding the signal according to the first mode;
 obtaining at least a second parameter from an at least partial encoding of the signal according to the second mode; and
 selecting a bit rate-distortion allocation mode for the encoding of the signal according to the second mode, as a function of the first and second parameters,
 wherein said computer-readable storage medium is detachably mountable on a device according to claim 9 or 10.

22. A computer-readable storage medium according to claim 20, comprising a floppy disk or a CD-ROM.

23. Computer program stored on a computer-readable storage medium and comprising computer executable instructions for transcoding a digital signal according to claim 1 or 2.

* * * * *

UNITED STATES PATENT AND TRADEMARK OFFICE
CERTIFICATE OF CORRECTION

| | |
|---|---|
| PATENT NO. | : 7,260,264 B2 |
| APPLICATION NO. | : 10/625699 |
| DATED | : August 21, 2007 |
| INVENTOR(S) | : Jeanne Guillou et al. |

It is certified that error appears in the above-identified patent and that said Letters Patent is hereby corrected as shown below:

COLUMN 2:

Line 42, "signal" should read --the signal--.

COLUMN 5:

Line 42, "invention" should read --invention.--; and
Line 61, "comprises" should read --comprises:--.

COLUMN 7:

Lines 5-6, "step. ¶ For example" should read --step. For example--;
Line 8, "here. The" should read --here. ¶ The--;
Line 13, "codeblock." should read --code-block.--; and
Line 41, "en coding" should read --encoding--.

COLUMN 8:

Line 6, "to be to" should read --be to--.

COLUMN 10:

Line 20, "the transcoded" should read --The transcoded--.

COLUMN 11:

Line 49, "the transcoded" should read --The transcoded--.

COLUMN 13:

Line 29, "comprise:" should read --comprises:--;
Line 44, "comprise:" should read --comprises:--; and
Line 59, "comprise:" should read --comprises:--.

UNITED STATES PATENT AND TRADEMARK OFFICE
CERTIFICATE OF CORRECTION

PATENT NO. : 7,260,264 B2
APPLICATION NO. : 10/625699
DATED : August 21, 2007
INVENTOR(S) : Jeanne Guillou et al.

It is certified that error appears in the above-identified patent and that said Letters Patent is hereby corrected as shown below:

COLUMN 14:

Line 29, "(10)" should be deleted;
    Line 54, "Computer" should read --A computer--; and
    Line 56, "according to" should read --according to the method of--.

Signed and Sealed this

Ninth Day of September, 2008

JON W. DUDAS
*Director of the United States Patent and Trademark Office*